United States Patent [19]
Chen

[11] Patent Number: 5,348,647
[45] Date of Patent: Sep. 20, 1994

[54] WATER FILTER WITH BACK WASH FUNCTION

[76] Inventor: T. H. Chen, 3F, No. 73, Chien Kwo Road, Hsinten, Taipei Hsien, Taiwan

[21] Appl. No.: 31,968

[22] Filed: Mar. 16, 1993

[51] Int. Cl.⁵ .......................................... B01D 41/04
[52] U.S. Cl. ................... 210/411; 210/416.1; 210/441; 210/443; 210/257.1
[58] Field of Search ............... 210/411, 257.1, 257.2, 210/282, 258, 269, 275, 354, 393, 408, 411, 416.1, 441, 443

[56] References Cited

U.S. PATENT DOCUMENTS

| | | | |
|---|---|---|---|
| 204,663 | 6/1878 | Gainey | 210/257.1 |
| 589,223 | 8/1897 | Robertson | 210/411 |
| 602,883 | 4/1898 | Tyden | 210/257.1 |
| 4,405,466 | 9/1983 | Giannelli et al. | 210/411 |
| 5,080,778 | 1/1992 | Chen | 210/415 |

Primary Examiner—Cynthia L. Nessler
Attorney, Agent, or Firm—Morton J. Rosenberg; David I. Klein

[57] ABSTRACT

A water filter is disclosed having a water reservoir in fluid communication with the porous ceramic core filter element and the drinking water control valve of a filter assembly, for holding a volume of water therein. The water reservoir provides a compressed air space, the air being compressed by an intake flow of water from the filter assembly. The compressed air in the water reservoir is released as a washing water control valve of the filter assembly is opened, thereby causing water from the reservoir to flow backwards through the filter element from inside out. This reverse flow carries dirt from small holes in the filter element, for draining from the washing water control valve.

1 Claim, 3 Drawing Sheets

WATER FILTER WITH BACK WASH FUNCTION

BACKGROUND OF THE INVENTION

The present invention relates to water filters and relates more particularly to a water filter which provides a back wash function to remove dirts from a filter element thereof through a back wash process.

A variety of water filters are known and widely used for removing dirts from water. However regular water filters requires regular cleaning or replacement. Because the average individual lacks either the time or the knowledge necessary to carry out the task of cleaning the filter element, often the filter element is left uncleaned. U.S. Pat. No. 5,080,788 discloses a water filter with fluid actuated cleaner which uses a rotator with roller brushes actuated by the intake flow of water to scrape off dirt adhered to the surface of the porous ceramic core thereof, therefore the frequency of cleaning or replacing the filter element can be reduced without affecting the performance of the water filter. Since the roller brushes can only remove dirts adhered to the surface of the filter element, dirts may be tangled in holes on the filter element to contaminate the flow water passing through and create a restriction to the water flow volume.

SUMMARY OF THE INVENTION

The present invention eliminates the aforesaid problems, According to the present invention, a water reservoir is disposed by the side of a water filter device. The water reservoir has a bottom input/output port connected between a center hole through the longitudinal axis of the filter element of the water filter device and the drinking water control valve thereof to hold a volume of water from the water filter device. As the washing water control valve of the water filter device is opened, a flow of water is forced to flow through the filter element inside out, carrying dirt particles from holes of the filter element for draining from the washing water control valve.

DETAILED DESCRIPTION OF THE PREFERRED EMBODIMENT

Figure 1:
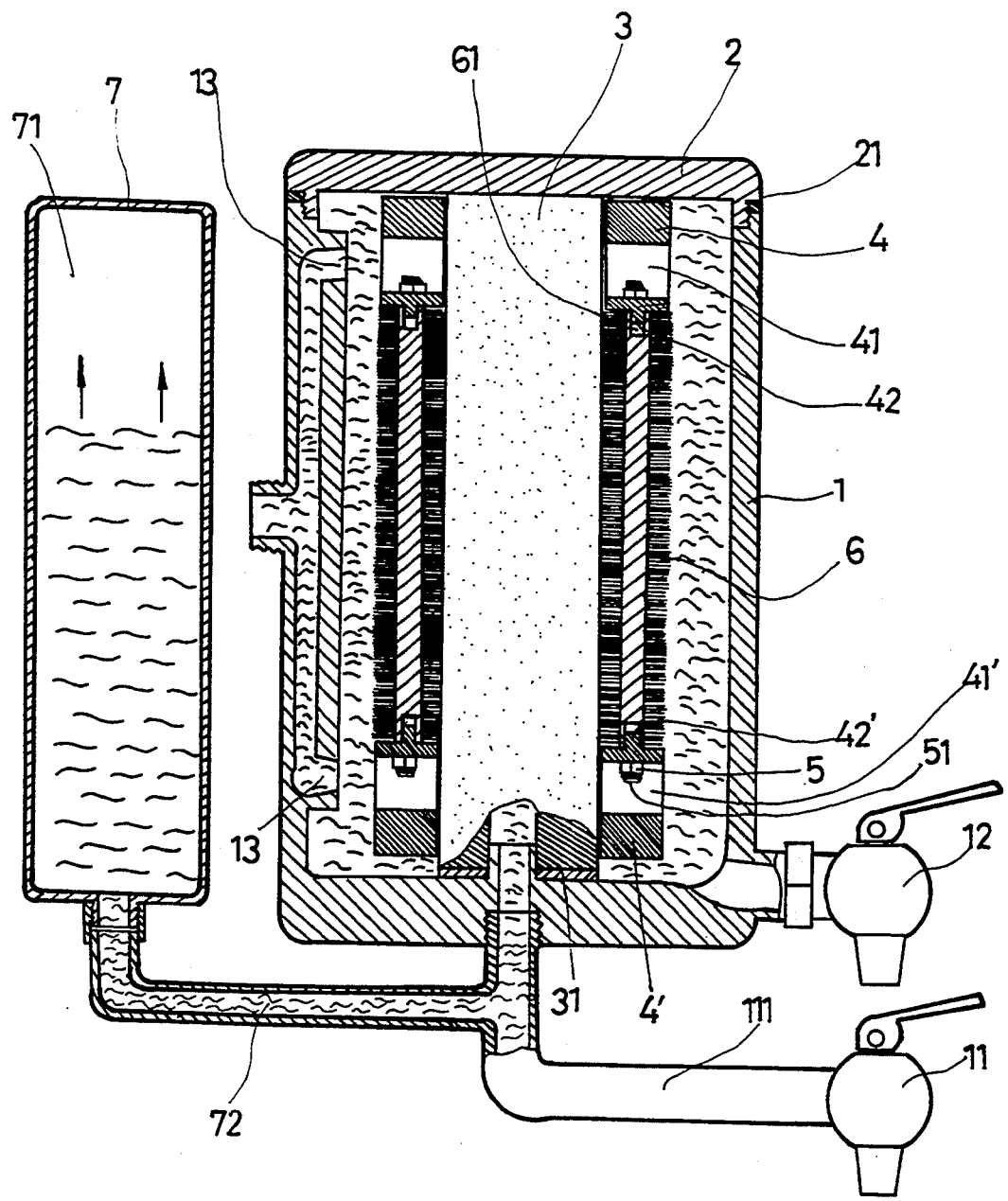
FIG. 1 is a sectional elevation of the preferred embodiment of the water filter of the present invention.
Figure 2:
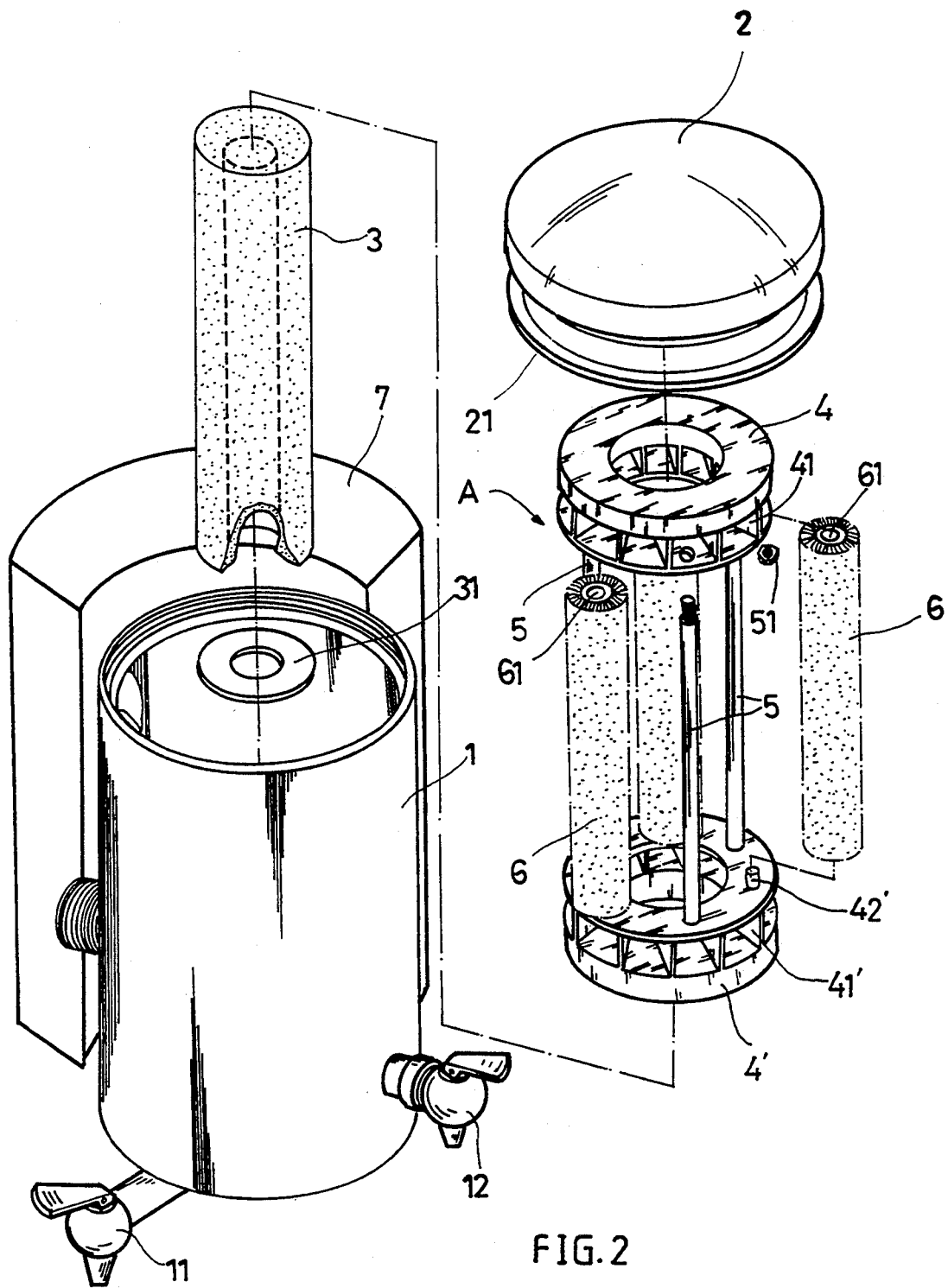
FIG. 2 is an exploded perspective view of the water filter.
Figure 3:
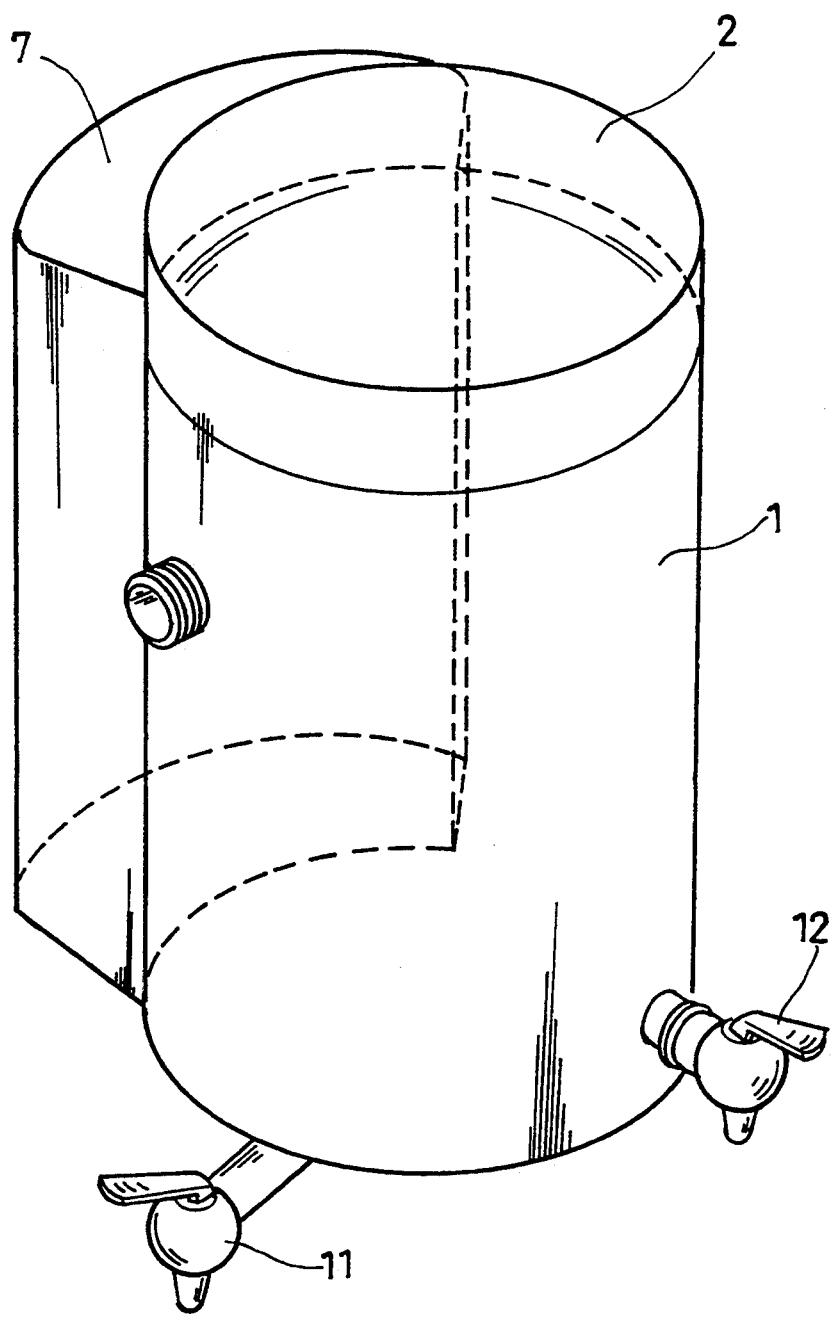
FIG. 3 is a perspective elevation of the water filter.

Referring to FIGS. 1 and 2, a water filter as constructed in accordance with the present invention is generally comprised of a cylindrical housing 1, a top cover 2, a filter element 3, and a rotator A. The filter element 3 is vertically fastened inside the housing 1 at the center and supported on a washer 31. The filter element 3 can be a porous ceramic core with active carbon for removing solid matters from the flow of water passing through. The cylindrical housing 1 has an upper open end covered by the top cover 2 and sealed by a washer 21. The rotator A is fastened inside the cylindrical housing 1 around the filter element 3, having upper and lower floats 4,4' and blades 41,41' assembled together with screws 5 and locknuts 51. Projecting posts 42,42' are disposed on a side of each of the upper and lower blades 41,41'. Access holes 61 on each end of the roller brushes 6 accommodate the projecting ports, for mounting the roller brushes 6 thereon. An angled water spray inlet 13 is positioned adjacent the upper and lower blades 41,41', such that flowing water drives the blades 41,41', after the opening of either drinking water control valve 11 or washing water control valve 12, causing rotator to rotate. In this manner, the roller brushes 6 scrape off dirt adhered to the surface of the filter element 3. Upon opening the washing water control valve 12, the water containing the dislodged dirt will drain from the washing water control valve 12, without passing through the filter element 3. Clean water quality is thereby maintained.

In order to maintain the high performance of the filter element 3 and eliminates restrictions imposed to the water flow volume by dirt particles, an enclosed water reservoir 7 is disposed by the water filter and connected to the drinking water outlet pipe 111 by a bottom water pipe 72. As the driving and washing water control valves 11, 12 are turned off, a continuous flow of water is filled into the water filter. Because the water reservoir 7 is with the drinking water outlet pipe 111, in fluid communications continuously filling water into the water filter causes a flow of water to flow into the enclosed water reservoir 7, compressing the air 71 inside. As soon as the air pressure of the compressed air 71 and the water pressure of the intake flow of water are equalized, water is stopped from entering the water filter. Once the washing water control valve 12 was opened, the compressed air 71 forces a flow of water to flow backwards through the bottom water pipe 72 into the filter element 3. The flow of water which enters the filter element 3 continuously flows from the inside to the outside, carrying dirt from the small holes of the filter element 3 while the roller brushes are rotated to scrape off dirt adhered to the surface of the filter element 3. As the performance of the filter element 3 is improved, a satisfactory filtration rate is constantly maintained, and therefore the water flow volume through the drinking water control valve 11 is never restricted.

What is claimed is:

1. An apparatus for cleaning water, comprising:
   means for filtering water, said water filtering means including, (1) a first housing having at least one housing wall and a pair of opposing end members, one of said pair of end members having an orifice formed therethrough, (2) a porous ceramic core filter element disposed within said housing and having a longitudinally directed bore formed therein for passage of filtrate therethrough, said longitudinally directed bore of said porous ceramic core filter element being coupled in fluid communication with said orifice, (3) a water inlet formed in said housing wall for entry of raw water therethrough, (4) a conduit extending from said orifice external to said first housing, (5) a drinking water control valve coupled to a distal end of said conduit, said conduit providing fluid communication between said drinking water control valve and said longitudinally directed bore of said porous ceramic core filter element, and (6) a washing water control valve coupled to said housing wall and in fluid communication with an inlet chamber defined between said housing wall and an external surface of said porous ceramic core filter element, said filtrate being defined by water passing through said porous ceramic core filter element from said external surface thereof to said longitudinally directed bore; and (7) means for back washing said porous ceramic core filter element with filtrate simultaneous with providing a flow of said raw water past said external surface thereof responsive to opening of said washing water control valve, said back washing means including means for storage of said filtrate and compressed air, said storage means including, (a) a second housing having a plurality of wall members for defining a closed cavity space therein, and (b) an inlet/outlet port formed on one end of said second housing, said back washing means further including means for conveying said filtrate from said storage means via said inlet/outlet port to said conduit disposed external to said first and second housings, wherein said compressed air within said storage means produces a flow of said filtrate through said porous ceramic core filter element from said longitudinally directed bore to said inlet chamber responsive to said washing water control valve being in an open condition for removing dirt particles from pores of said porous ceramic core filter element.

* * * * *